UNITED STATES PATENT OFFICE.

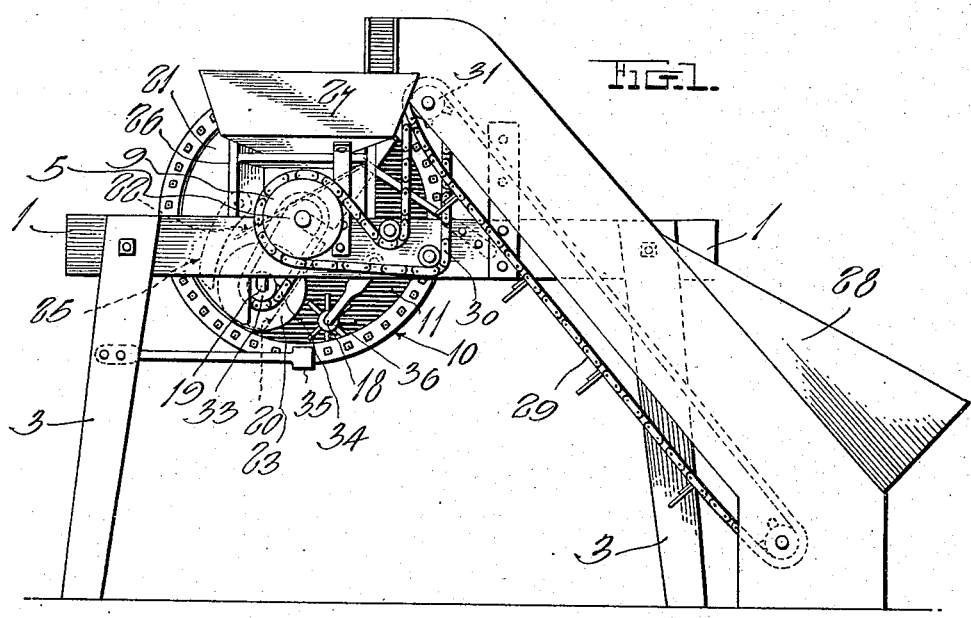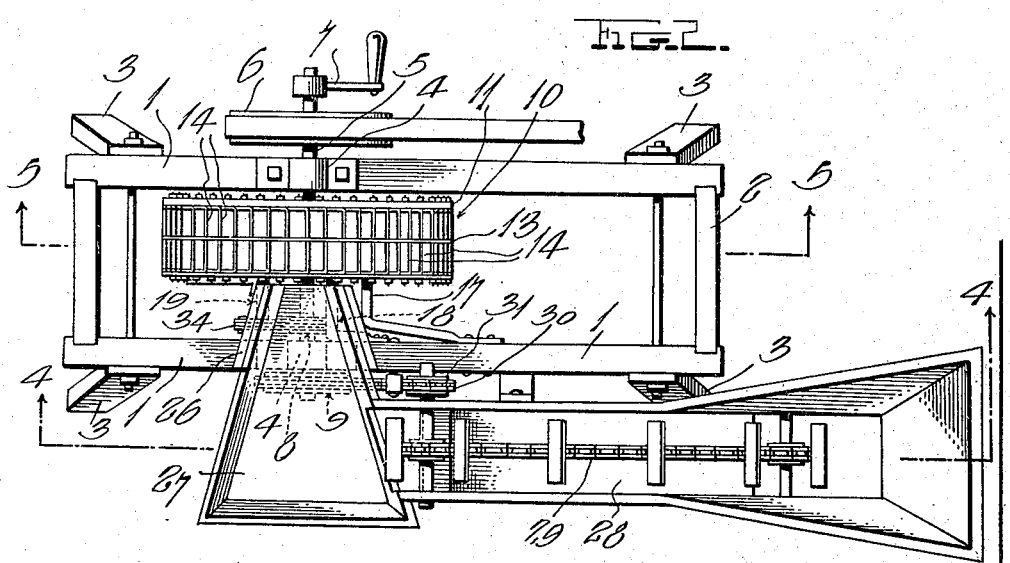

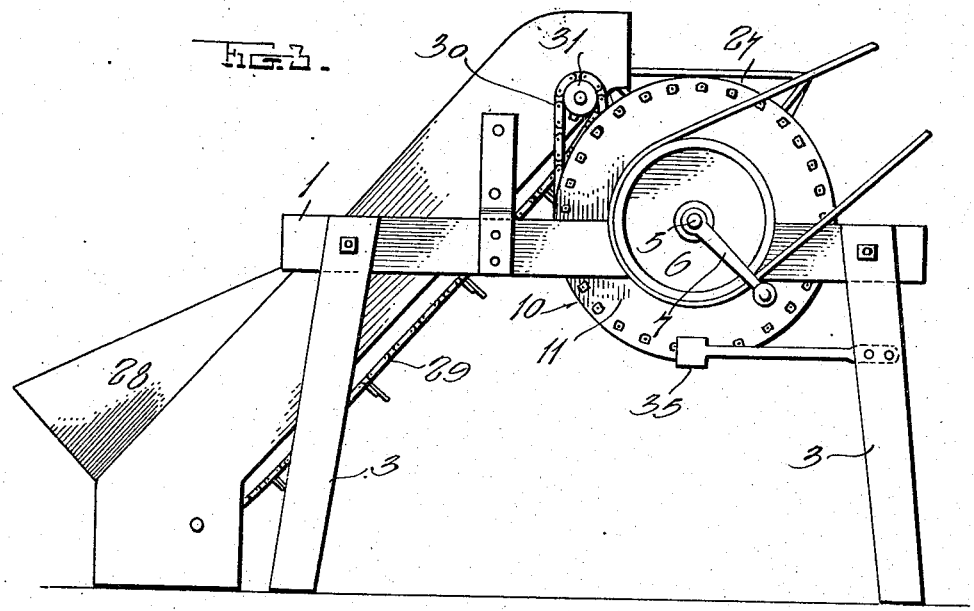

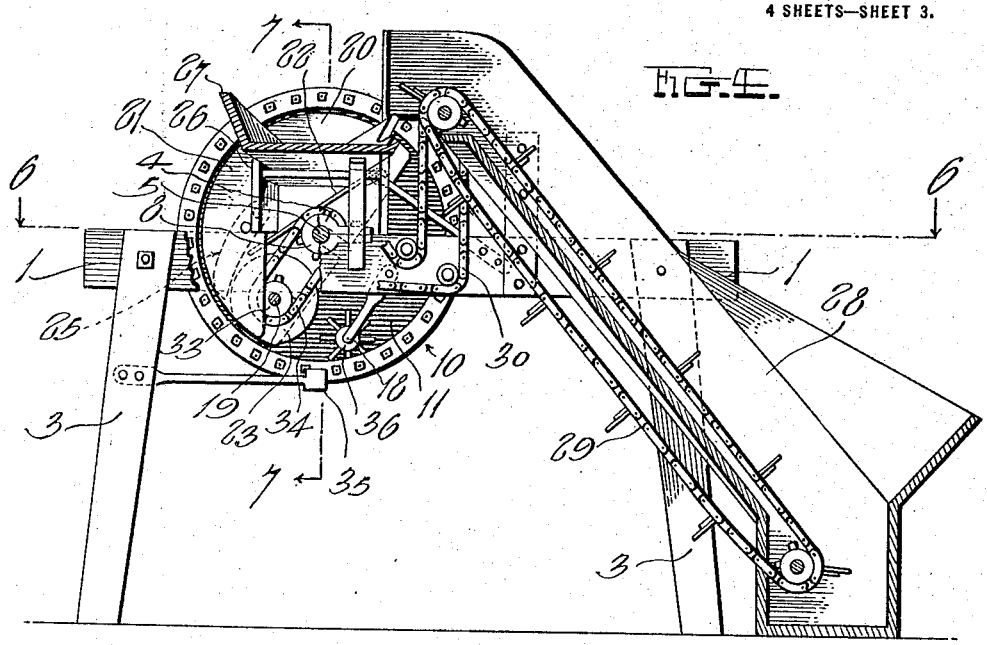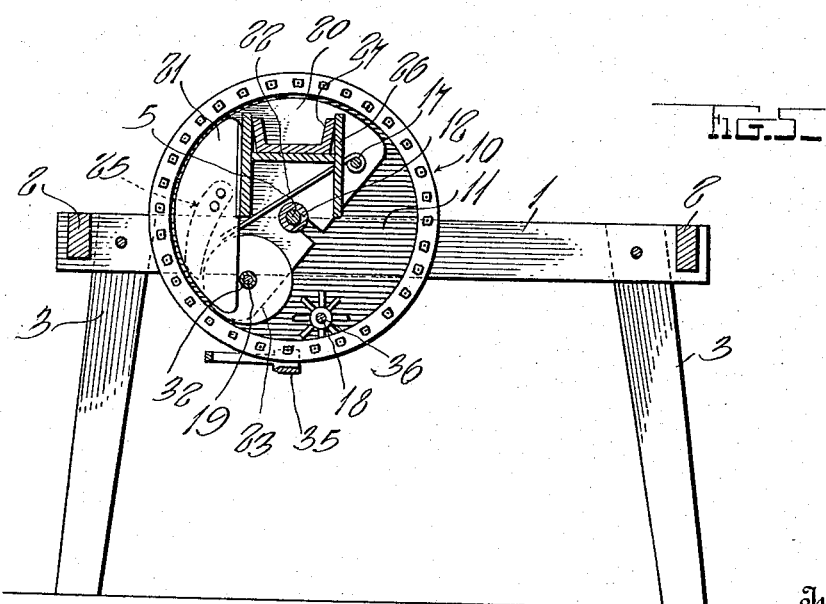

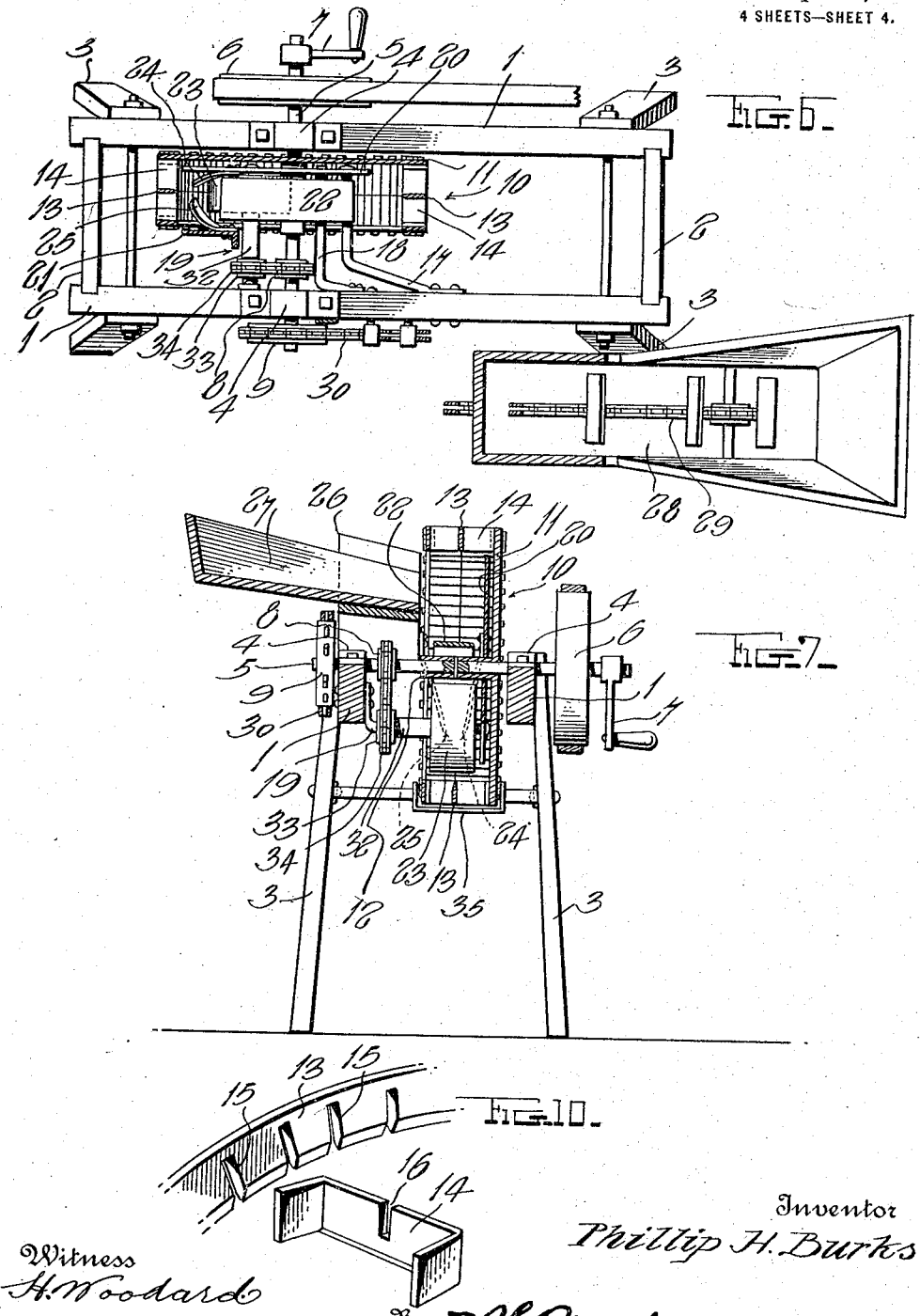

PHILLIP H. BURKS, OF GORDON, NEBRASKA.

VEGETABLE-CUTTER.

1,223,254.  Specification of Letters Patent.  Patented Apr. 17, 1917.

Application filed December 1, 1916. Serial No. 134,369.

*To all whom it may concern:*

Be it known that I, PHILLIP H. BURKS, a citizen of the United States, residing at Gordon, in the county of Sheridan and State of Nebraska, have invented certain new and useful Improvements in Vegetable-Cutters; and I do declare the following to be a full, clear, and exact description of the invention, such as will enable others skilled in the art to which it appertains to make and use the same.

This invention relates to vegetable cutters to be used more particularly in cutting seed potatoes.

The primary object of the invention is to construct an improved device of this character, whereby the potatoes or other vegetables will be cut into pieces of substantially uniform sizes.

Another object of the invention is to provide an improved arrangement of cutting knives.

A further object of the invention is to provide an improved means of delivering the potatoes or other vegetables into the machine and to force them into contact with the cutting knives.

An additional object of the invention is to generally improve upon devices of this character by the provision of a device which will be of comparatively simple, strong, and durable construction, and one which will be efficient and reliable in operation, and well adapted to the purpose for which it is designed.

With these and numerous other objects in view, the invention consists of certain novel features of construction, and the combination and arrangement of parts as will be hereinafter fully described and claimed.

In the accompanying drawings, forming a part of the application, and in which similar reference characters designate like parts throughout the several views:—

Figure 1 is a side elevation of a device constructed in accordance with this invention;

Fig. 2 is a top plan view of the same;

Fig. 3 is a side elevation of the device, looking at it from the opposite side from that seen in Fig. 1;

Fig. 4 is a vertical sectional view through the device taken on the plane of the line 4—4 of Fig. 2;

Fig. 5 is a similar view taken on the plane of the line 5—5 of Fig. 2;

Fig. 6 is a horizontal sectional view taken on the plane of the line 6—6 of Fig. 4;

Fig. 7 is a transverse sectional view taken on the plane of the line 7—7 of Fig. 4;

Fig. 8 is a vertical sectional view of a portion of the revolving drum;

Fig. 9 is an edge view of the drum;

Fig. 10 is a perspective view illustrating the construction of the circular and transverse knives of the revolving drum; and Fig. 11 is a vertical sectional view of a portion of the revolving drum, showing the arrangement of the toothed wheel for forcing the potatoes out of the drum with respect to the knives of the same.

Briefly stated, the invention comprises a supporting frame upon which is revolubly mounted a hollow skeleton drum, the edge of which is composed of a circular knife and a plurality of transverse knives. One side of the drum is open, and disposed adjacent this open side is the discharge end of a chute. The potatoes or other vegetables fed into the interior of the drum by this chute are then conveyed toward the edge of the drum, and forced into engagement with the cutting knives by a roller which is likewise mounted within the interior of the drum. After the potatoes have been thus cut or sliced, they are forced out of the open edge of the drum by a toothed wheel which engages between the transverse knives of the same in a manner similar to the engagement of a pinion with an internal gear.

The supporting frame above referred to is composed of a pair of side bars 1, a pair of transverse bars 2, and supporting legs 3. As shown clearly by Fig. 2 of the drawings, the frame is rectangular in configuration. Fixed to the upper edges of the side bars 1 near one of their ends, is a pair of alined bearings 4, in which is revolubly mounted a shaft 5. One end of the shaft 5 is provided with a pulley wheel 6 and a crank arm 7. By this construction, the shaft may be rotated either manually or by motor power. The other end of the shaft 5 is provided with a pair of sprocket gears 8 and 9, the sprocket gear 8 being disposed adjacent the inner side of one of the side bars 1, while the sprocket gear 9 is disposed on the exterior side of said side bar. The purpose of these gears will be hereinafter described.

Fixed to the shaft 5 in any suitable manner is a hollow skeleton drum 10. This drum 10 is composed of a circular end plate 11 provided with a hub portion 12, a circular cutting knife 13, and a plurality of transverse knives 14 at its circumference, the knives 14 being disposed in radial planes with respect to the axis of said drum. As shown clearly in Fig. 10 of the drawings, the inner edge of the circular knife 13 is provided with a plurality of notches 15, while the outer edges of the transverse knives 14 are provided with notches 16. By this construction, it may be seen that the knives may be fitted together so that the cutting edges of the transverse knives 14 will be disposed flush with the cutting edge of the circular knife 13, and the same will be true of the outer edges of said knives. It will be seen that these knives of themselves form the open edge of the drum, the side of the same opposite the circular plate 11 being open, for a purpose which will hereinafter appear.

Fixed at one of their ends to the inner side of the side bar 1 disposed adjacent the open end of the drum 10 are shafts 17, 18 and 19, which extend into the interior of the drum and stop a very slight distance from the circular plate 11 of the same. In addition to other functions which the shafts 17 and 19 have which will be hereinafter described, these two shafts form a means for supporting a semi-circular plate 20. This plate 20 is disposed within the interior of the drum adjacent the circular plate 11. Supported in any suitable manner adjacent the open end of the drum is a plate 21. Disposed between the plates 20 and 21 and having its upper end hooked over the shaft 17 is a guide plate 22, the lower end of which is disposed adjacent a roller 23, which is revolubly mounted upon the shaft 19. It is to be here noted that this roller is disposed eccentrically with respect to the drum 10, and adjacent the knives of the same, whereby it may force the potatoes or other vegetables into engagement with the latter. Secured to the plates 20 and 21 adjacent the side edges of the guide plate 22 is a pair of guide fingers 24 and 25. These fingers form a means for guiding the potatoes into proper engagement with the knives, the circular knife 13 being arranged midway of the ends of the transverse knives 14, and hence unless the potatoes were fed centrally with respect to said transverse knives, the circular knife would not slice them uniformly.

Fixed to the side bar 1 arranged adjacent the open side of the drum 10 is a frame 26, which supports a chute 27. As shown in the drawings, the discharge end of the chute 27 is disposed adjacent the open side of the drum 10 slightly above the upper end of the guide plate 22. The numeral 28 designates a hopper arranged alongside the frame of the machine and into which the potatoes or other vegetables are dumped. The potatoes are conveyed from the hopper 28 into the chute 27 by means of an endless conveyer 29. This conveyer 29 is actuated by means of a sprocket chain 30 which passes over the sprocket gear 9 above referred to, and a sprocket gear 31 fixed to one of the shafts of said conveyer. By this arrangement, whenever the shaft 5 is rotated, the conveyer 29 may be operated, and the potatoes will be automatically conveyed from the hopper 29 into the chute 27, from which they will roll onto the guide plate 22, down the latter between the guide fingers 24 and 25 and into engagement with the knives of the drum.

The roller 23 is provided with a hub portion 32, which extends to the exterior of the drum and has on its outer end a small sprocket gear 33. Passing over this gear 33 is a sprocket chain 34 which also passes around the above referred to gear 8 carried by the shaft 5. Consequently, it may be seen that motion is imparted to the roller 23, and as the potatoes are fed between the guide fingers 24 and 25, they will be forced into engagement with the knives.

After the potatoes have been cut by the circular knife 13 and transverse knives 14 and have been projected a slight distance beyond the outer edges of said knives under the pressure of the roller 23, they will come into engagement with a stationary knife 35 arranged on the exterior of the drum. This knife 35 is disposed substantially tangentially with respect to the drum, and will cut the potatoes in a direction at right angles to the cuts made by the knives carried by the drum.

In the event that the potatoes are very large, certain portions of them will become stuck between the knives of the drum after they have passed the stationary knife 35, and in order to force them out from between said knives, a toothed wheel 36 is disposed within the drum. This wheel is revolubly mounted on the shaft 18 fixed at one end to the supporting frame, and is disposed adjacent the edge of the drum so that its teeth or fingers will engage between the transverse knives 14 and be turned by the drum. The movement is somewhat similar to that of a pinion and gear meshing with one another.

From the foregoing description, taken in connection with the accompanying drawings, it will be seen that the object of the invention has been effectively carried out, as a practical and efficient machine for cutting seed potatoes or the like into pieces of uniform size has been provided. The machine is automatic in operation, that is, it is only necessary to dump the potatoes into the hopper and either rotate the main driving shaft manually or by motor power.

As various changes in form, proportion and in the minor details of construction, may be resorted to without departing from the spirit of this invention, I do not wish to be limited to the construction herein shown and described other than as claimed.

I claim:—

1. A device of the class described comprising a revolving skeleton drum, a circular knife and a plurality of transverse knives arranged at the circumference of said drum and having their cutting edges disposed on the interior of the same, the transverse knives being arranged in radial planes with respect to the axis of said drum, and a roller revolubly mounted eccentrically within the interior of said drum for forcing the articles fed into the latter into contact with said knives.

2. A device of the class described comprising a revolving skeleton drum, a circular knife and a plurality of transverse knives carried by said drum and having their cutting edges disposed within the interior of the same, said knives forming the edge of said drum, means disposed within the interior of said drum for forcing the articles fed into the same into contact with said knives, means disposed within the interior of said drum for forcing said articles out through the edge of said drum, and a stationary knife disposed on the exterior of said drum for slicing said articles as they are forced out of said drum.

3. A device of the class described comprising a supporting frame, a hollow drum revolubly mounted upon said frame and having one of its sides open, a plurality of knives carried by said drum and having their cutting edges disposed within the interior of the same, said knives forming the edge of said drum, a roller revolubly mounted eccentrically within the interior of said drum, a chute supported exteriorly of said drum and having its discharge end disposed adjacent the open side of the same, and means supported within the interior of said drum for guiding the articles fed into the same by said chute into engagement with said roller, the latter forcing such articles into contact with said knives.

4. A device of the class described comprising a supporting frame, a hollow drum revolubly mounted upon said frame and having one of its sides open, a plurality of knives carried by said drum and having their cutting edges disposed within the interior of the same, said knives forming the edge of said drum, a roller revolubly mounted eccentrically within the interior of said drum, a chute supported exteriorly of said drum and having its discharge end disposed adjacent the open side of the same, a guide plate supported within the interior of said drum and having one of its ends disposed adjacent the discharge end of said chute, the other end of said plate being disposed adjacent said roller, and a pair of guide fingers supported within the interior of said drum and being disposed adjacent the side edges of said plate.

5. A device of the class described comprising a supporting frame, a hollow drum revolubly mounted upon said frame and having one of its sides open, a plurality of knives carried by said drum and having their cutting edges disposed within the interior of the same, said knives forming the edge of said drum, a roller revolubly mounted eccentrically within the interior of said drum, a chute supported exteriorly of said drum and having its discharge end disposed adjacent the open side of the same, a pair of plates mounted upon said frame, one of said plates being disposed within the interior of said drum, the other plate being disposed adjacent the open side of the latter, a guide plate supported within the interior of said drum between said pair of plates, one end of said guide plate being disposed adjacent the discharge end of said chute, the other end of said guide plate being disposed adjacent said roller, and a pair of guide fingers fixed to said pair of plates and disposed adjacent the side edges of said guide plate.

6. A device of the class described comprising a supporting frame, a hollow drum revolubly mounted upon said frame, a plurality of knives carried by said drum and having their cutting edges disposed within the interior of the same, a chute discharging into said drum, means for forcing the articles fed into said drum by said chute into contact with said knives, a hopper, and a conveyer leading from said hopper to said chute to deliver the articles placed in said hopper into said chute.

In testimony whereof I have hereunto set my hand in the presence of two subscribing witnesses.

PHILLIP H. BURKS.

Witnesses:
C. HILL,
BLANCHE PARKER.

Copies of this patent may be obtained for five cents each, by addressing the "Commissioner of Patents, Washington, D. C."